United States Patent [19]

Mathauer et al.

[11] Patent Number: 6,160,049
[45] Date of Patent: Dec. 12, 2000

[54] EMULSION POLYMERIZATION PROCESS WITH COMBINATION MACROEMULSION AND MINIEMULSION FEED STREAMS

[75] Inventors: Klemens Mathauer; Walter Mächtle, both of Ludwigshafen; Graham Edmund McKee; Hubertus Kröner, both of Neustadt, all of Germany

[73] Assignee: BASF Aktiengesellschaft, Ludwigshafen, Germany

[21] Appl. No.: 09/147,203

[22] PCT Filed: Jun. 30, 1997

[86] PCT No.: PCT/EP97/03397

§ 371 Date: Oct. 28, 1998

§ 102(e) Date: Oct. 28, 1998

[87] PCT Pub. No.: WO98/02466

PCT Pub. Date: Jan. 22, 1998

[30] Foreign Application Priority Data

Jul. 12, 1996 [DE] Germany .................. 196 28 143

[51] Int. Cl.[7] ....................................................... C08F 2/22
[52] U.S. Cl. ................... 524/804; 526/72; 526/87
[58] Field of Search ............... 524/804; 526/72, 526/87

[56] References Cited

U.S. PATENT DOCUMENTS 4,642,323  2/1987  Ranka .

FOREIGN PATENT DOCUMENTS 0 401 565  5/1990  European Pat. Off. .
0 520 478  6/1992  European Pat. Off. .
40 25 290  8/1990  Germany .
2 138 830  10/1984  United Kingdom .

OTHER PUBLICATIONS

P. Rajatapiti, V.L. Dimonie, M.S. El–Aasser, Polymeric Materials Science and Engineering, Proc. of the ACS Division of Polymeric Materials Science and Engineering, 71 (1994), pp. 57 to 59.

Journal of Applied Polymer Science, vol. 49, pp 633 to 655 (1993).

Fontenot et al., Batch Polymerization of Methyl Methacrylate in Mini/Macroemulsions, Journal of Applied Polymer Science, vol. 49, pp 633–655 (1993).

*Primary Examiner*—David W. Wu
*Assistant Examiner*—Kelechi C. Egwim
*Attorney, Agent, or Firm*—Oblon, Spivak, McClelland, Maier & Neustadt, P.C.

[57] ABSTRACT

A process for preparing an aqueous polymer dispersion by free-radically initiated polymerization of free-radically polymerizable compounds I with moderate solubility in water, whose disperse polymer particles contain not only compounds I but also compounds II with a very low solubility in water where a mixture consisting of a portion of the compounds I and consisting of the compounds II is used to produce an aqueous emulsion I with a droplet size $\leq 500$ nm, and at least a portion of the aqueous emulsion I is supplied continuously to the polymerization vessel as a feed stream I, in the course of continuing free-radical polymerization, during which the continuous feed stream I is accompanied, at least some of the time, by a feed stream II consisting of another portion of the compounds I or of the aqueous emulsion II thereof with a droplet size $\geq 1000$ nm.

29 Claims, No Drawings

EMULSION POLYMERIZATION PROCESS WITH COMBINATION MACROEMULSION AND MINIEMULSION FEED STREAMS

The present invention relates to a process for preparing an aqueous polymer dispersion by free-radically initiated polymerization of free-radically polymerizable compounds whose individual solubility in water under the conditions (pressure, temperature) of the free-radically initiated polymerization is at least 0.001% by weight, based on the respective saturated aqueous solution (compounds I), whose disperse polymer particles comprise, in addition to the compounds I, at least one compound II whose solubility in water under the conditions (pressure, temperature) of the free-radically initiated polymerization is less than 0.001% by weight, based on the respective saturated aqueous solution, and in which process a mixture consisting of a portion of the compounds I and of the at least one compound II is used to produce an aqueous oil (disperse phase)-in-water(continuous phase) emulsion I whose disperse phase consists predominantly of droplets with a diameter $\leq 500$ nm, and in which at least a portion of the aqueous emulsion I is supplied to the polymerization vessel in the course of continuing free-radical polymerization.

Aqueous polymer dispersions are fluid systems whose disperse phase in an aqueous dispersion medium comprises polymer particles which are in stable disperse distribution. The diameter of the polymer particles is predominantly within the range of, in general, from 0.01 to 5 $\mu$m and, in many cases, from 0.01 to 1 $\mu$m.

Like polymer solutions when the solvent is evaporated, aqueous polymer dispersions have the property, when the aqueous dispersion medium is evaporated, of forming polymer films, which is why aqueous polymer dispersions are much employed as binders, for example for paints or for leather-coating compositions.

Aqueous polymer dispersions are usually prepared by free-radical aqueous macroemulsion polymerization of free-radically polymerizable compounds, the latter normally comprising—with the exception of any minor amounts of molecular weight regulators additionally employed—monomers containing at least one ethylenically unsaturated group (often referred to below just as monomers for short).

In this procedure the monomers that are to be polymerized, and also any molecular weight regulators additionally used, are emulsified in the aqueous medium without any relatively great effort, for example by means of customary stirring, and, with the addition of free-radical polymerization initiators which dissolve in the aqueous medium, are subjected to polymerization. The term emulsion as used here denotes that a system of two mutually insoluble or only sparingly soluble liquids is present in which the liquids are in a state of more or less fine dispersion. The liquid which is present in excess is termed the continuous or external phase, and the liquid dispersed as droplets in the discontinuous phase is termed the disperse phase. The term aqueous emulsion, then, is generally used to refer to an emulsion in which the aqueous phase constitutes the continuous phase. The preparation of an emulsion normally requires the addition of emulsifiers (Ullmanns Encyklopädie der technischen Chemie, Vol. 10, 4th Edition, Verlag Chemie, Weinheim (1975), p. 449) which prevent the direct combination of two liquid droplets in the disperse distribution that happen to collide. The prefix "macro" expresses the fact that the aqueous monomer emulsion is one whose disperse phase consists, as a result of the low dispersion effort, predominantly of droplets with a diameter $\geq 1000$ nm.

An essential feature of the free-radical aqueous macroemulsion polymerization, then, is that each of the monomers that are to be polymerized has a certain level of solubility in water under the conditions (pressure, temperature) of the free-radical aqueous macroemulsion polymerization. Thus the polymerization initiator dissolved in the external aqueous phase of the aqueous macromonomer emulsion has available to it, in the same external aqueous phase, a large number of dissolved monomers as coreactants. Above a critical chain length, the resulting oligomer radicals precipitate (homogeneous nucleation) and form primary particles. where the rate of radical capture by such primary particles is equal to the rate of radical initiation, the polymer particle formation phase is essentially at an end, and is followed by the polymer particle growth phase. In this phase, the monomers diffuse from the dispersed monomer droplets through the water phase into the polymer primary particles, where as a result of the captured radicals they are polymerized and attached to the primary particle. In the course of this procedure, the molecular weight regulators behave essentially like monomers, and differ from the monomers essentially only in that they normally contain no ethylenically unsaturated double bond and are therefore not capable of maintaining the polymerization chain, but instead terminate it.

Since homogeneous nucleation is a stochastic process, its reproducibility is unsatisfactory. Therefore, it is usual in the course of free-radical aqueous macroemulsion polymerization to increase the amount of emulsifier present in the aqueous macromonomer emulsion to levels above the critical micelle concentration so as to provide, in the external aqueous phase, a large reproducible number of micellar residence sites, thereby making it possible to suppress homogeneous nucleation. Because of their large surface area, the micelles capture the oligomer radicals and function—in a manner corresponding to that of the primary particles—as the polymerization centers (heterogeneous nucleation), the ratio between the amount of monomer to be polymerized and the available micelles essentially determining the diameter of the resulting polymer particles which are formed automatically in a state of disperse distribution. The surface area offered by the large monomer droplets is very much smaller than that of the small micelles, and is essentially unable to capture any oligomer radicals.

In other words, in the course of free-radical aqueous macroemulsion polymerization, the sites of polymerization are outside the dispersed monomer droplets in the aqueous phase, and the dispersed monomer droplets function merely as a monomer reservoir from which the polymerization sites are supplied with monomers by diffusion via the aqueous phase.

However, the limits of this principle become evident when the monomers that are to be copolymerized comprise not only those which can be polymerized by free-radical aqueous macroemulsion polymerization but also those such as, for example, stearyl acrylate or vinyl stearate whose solubility in water under polymerization conditions is <0.001% by weight, based on the saturated aqueous solution (Moore estimated the solubility of vinyl stearate in water [cf. J. Polym. Sci., Part A-1, 1967,5, 2665] to be $10^{-10}$ mol/dm$^3$). Owing to their inadequate solubility in water, such monomers are unable to be transported at a sufficient rate to the polymerization sites, which in the case of free-radical aqueous macroemulsion polymerization are located in the continuous, aqueous phase. They therefore remain behind as residual droplets of the original monomer droplets, and are essentially not incorporated into the polymer particles. In many cases, however, it is precisely the copolymerization of hydrophilic monomers of this kind which is desired in order to maximize the hydrophobicity of the films formed from the resulting aqueous polymer dispersion.

The fact that in free-radical aqueous macroemulsion polymerization the monomer droplets dispersed in the aqueous medium are not the actual sites of polymerization is also disadvantageously manifest when organic auxiliaries which are of low solubility in water, for example plasticizers, substances which improve the tackiness of the resulting film, film-forming auxiliaries or other organic additives, are to be incorporated into the aqueous polymer dispersion.

Although these substances are in general compatible with the monomer phase, if incorporated into the monomer phase before the beginning of the free-radical aqueous macroemulsion polymerization they too remain behind as residual droplets of the original monomer droplets and, in the resulting aqueous polymer dispersion, form separate particles which differ, generally considerably, in their mass density and size from the polymer particles formed, a circumstance which may lead to sedimentation, flotation and/or coagulation. What would be desirable, in contrast, would be for these additives to reside in the dispersed polymer particles themselves, which is something that can normally not be achieved by the subsequent incorporation of such additives into the finished aqueous polymer dispersion.

The problems highlighted above associated with free-radical aqueous macroemulsion polymerization can be remedied, conventionally, by taking special measures to reduce the size of the monomer droplets in the aqueous emulsion of monomers (and, if used, of additives) to such an extent that these droplets predominantly have a diameter $\leq$500 nm. If, at the same time, the amount of emulsifier is such that essentially no micelle formation is present in the aqueous medium, then the oligomer radicals are captured by the small monomer droplets, which have a comparatively large overall surface area, and polymerization takes place within the monomer droplets themselves.

Deriving from the small size of the monomer droplets, this manner of free-radical aqueous emulsion polymerization is termed free-radical aqueous miniemulsion polymerization, and the aqueous initial emulsion is referred to as a monomer miniemulsion. Using the method of free-radical aqueous miniemulsion polymerization, it is possible with ease to copolymerize even particularly hydrophobic monomers (including, for example, macromonomers (such as oligopropene acrylates)=oligomers or polymers having at least one ethylenically unsaturated double bond). If other hydrophobic additives are incorporated, prior to the production of the aqueous monomer miniemulsion, into the monomers which are to be polymerized, then these additives are, advantageously, also still present—in chemically and/or physically bonded form—in the dispersed polymer particles.

However, in the course of the free-radical aqueous miniemulsion polymerization the abovementioned hydrophobic components not only do not have a disadvantageous effect but also normally have a positive effect on the course of the polymerization, by lessening the phenomenon known as Ostwald ripening. This term refers to the process by which the smaller monomer droplets, as a result of their increased radius of curvature and the resulting increased diffusion pressure, lose monomers to the larger monomer droplets. A further advantage of free-radical aqueous miniemulsion polymerization is that by adjusting the particle size of the aqueous monomer miniemulsion it is possible in a simple manner to regulate the size of the resulting polymer particle diameters, since the latter correspond essentially to the particle size. In many cases the predominant diameters of the aqueous monomer miniemulsion are above 40 nm. A favorable droplet diameter range is that from 100 nm to 300 nm, or from 100 nm to 200 nm. This distinguishes free-radical aqueous miniemulsion polymerization significantly from free-radical aqueous suspension polymerization, which starts from an aqueous monomer emulsion with a monomer droplet size $\geq$0.01 mm. Moreover, for free-radical aqueous suspension polymerization it is absolutely necessary to use those free-radical polymerization initiators which preferably do not dissolve in the continuous aqueous medium but, instead, dissolve directly in the monomer droplets themselves. Admittedly, those initiators referred to as oil-soluble free-radical polymerization initiators can also be used for free-radical aqueous miniemulsion polymerization, but are less preferable for its implementation. The reason for this is that, as a result of their preferred residence in the monomer droplets, the local concentration of free radicals therein is usually comparatively high. This promotes termination reactions by the free-radical chain, and also free-radical recombination, thereby reducing the polymeric molecular weight that can be achieved and the rate of polymerization.

A further advantage of free-radical aqueous miniemulsion polymerization is that it makes it possible to prepare fine aqueous polymer dispersions with a relatively low emulsifier content (it is not necessary to exceed the critical micelle concentration). A precondition for ideal accomplishment of a free-radical aqueous miniemulsion polymerization is that the free-radical polymerization is initiated more or less simultaneously in all monomer droplets of the aqueous monomer miniemulsion. If this precondition is not met, then, as with free-radical aqueous macroemulsion polymerization, the monomer droplets which have not undergone initiation function as a monomer reservoir for those monomer droplets which have undergone initiation. By this means they alter their composition, which in the case of their subsequent initiation can lead to heterogeneities in the composition of the resulting polymer particles. In the worst-case scenario, the hydrophobic droplet constituents remain as residual droplets and give rise to coagulation or creaming, etc.

To take account of these circumstances, the free-radical aqueous miniemulsion polymerization is usually carried out batchwise, ie. the aqueous monomer miniemulsion is produced, charged to the polymerization vessel, heated to the polymerization temperature and then, while stirring, is admixed with an adequate amount of free-radical aqueous polymerization initiator (cf. eg. P. Rajatapiti, V. L. Dimonie, M. S. El-Aasser, Polymeric Materials Science and Engineering, Proc. of the ACS Division of Polymeric Materials Science and Engineering, 71 (1994), pp. 57 to 59; Journal of Applied Polymer Science, Vol. 49, pp. 633 to 655 (1993); EP-A 520478; EP-A 401 565;).

However, a problem with all free-radical polymerizations of monomers containing at least one ethylenically unsaturated group is that they are extremely exothermic. For reasons of safe reaction control, therefore, they are generally carried out batchwise only with the utmost disinclination.

Instead, preference is given to the feed method, in which the monomers to be subjected to free-radical polymerization are supplied continuously to the polymerization zone in accordance with the rate at which they are consumed, in the course of continuing polymerization.

If an aqueous monomer miniemulsion is supplied continuously, at the rate at which it is consumed, to a polymerization zone while polymerization continues, then at a later point in time there are always supplied monomer droplets which meet with monomer droplets which have already undergone free-radical initiation. As a result, the former serve as a monomer reservoir for the latter until the former are themselves initiated. This leads to the disadvantages already described.

DE-A 40 25 290 makes an attempt to counter this problem by using an oil-soluble polymerization initiator which is dissolved in the monomers prior to the preparation of the aqueous monomer miniemulsion.

A procedure of this kind is, however, extremely risky and barely acceptable as an industrial process.

The reason for a further disadvantage of a pure monomer miniemulsion feed procedure is that the flow resistance of an aqueous monomer miniemulsion increases greatly, owing to the small diameter of the monomer droplets, as the weight proportion of emulsified monomers increases. Monomer proportions of more than 50% by weight are therefore barely conceivable. This limits, accordingly, the possible volume solids content of the resulting aqueous polymer dispersion.

It is an object of the present invention, therefore, to provide a process of free-radical aqueous miniemulsion polymerization in which at least a portion of the aqueous monomer miniemulsion is supplied continuously to the polymerization zone in the course of continuing polymerization, where the disadvantages of the prior-art processes are present to a lesser extent.

We have found that this object is achieved by a process for preparing an aqueous polymer dispersion by free-radically initiated polymerization of free-radically polymerizable compounds whose individual solubility in water under the conditions (pressure, temperature) of the free-radically initiated polymerization is at least 0.001% by weight, based on the respective saturated aqueous solution (compounds I), whose disperse polymer particles comprise, in addition to the compounds I, at least one compound II whose solubility in water under the conditions (pressure, temperature) of the free-radically initiated polymerization is less than 0.001% by weight, based on the respective saturated aqueous solution, and in which process a mixture consisting of a portion of the compounds I and of the at least one compound II is used to produce an oil (disperse phase)-in-water (continuous phase) emulsion I whose disperse phase consists predominantly of droplets with a diameter $\leq 500$ nm, and in which at least a portion of the aqueous emulsion I is supplied continuously as a feed stream I to the polymerization vessel in the course of continuing free-radical polymerization, wherein the continuous feed stream I is accompanied at least some of the time by at least one feed stream II, with the proviso that at least one feed stream II is a feed stream of another portion of the compounds I and/or is an oil(disperse phase)-in-water(continuous phase) emulsion II of another portion of the compounds I, whose disperse phase consists predominantly of droplets with a diameter of $\geq 1000$ nm.

Suitable compounds I are all those monomers containing at least one ethylenically unsaturated group which are normally employed in the context of free-radical aqueous macroemulsion polymerization. These monomers include olefins, for example ethylene, vinyl-aromatic monomers, such as styrene, α-methylstyrene, o-chlorostyrene or vinyltoluenes, vinyl halides and vinylidene halides, such as vinyl chloride and vinylidene chloride, esters of vinyl alcohol and $C_1$–$C_{12}$ monocarboxylic acids, such as vinyl acetate, vinyl propionate, vinyl n-butyrate, vinyl laurate and commercially available monomers VEOVA® 9-11 (VEOVA X is a trade name of Shell and stands for vinyl ester of carboxylic acids, which are also referred to as Versatic® X acids), esters of allyl alcohol and $C_1$–$C_{12}$ monocarboxylic acids, such as allyl acetate, allyl propionate, allyl n-butylate and allyl laurate, esters of preferably $C_3$–$C_6$ α,β-monoethylenically unsaturated mono- and dicarboxylic acids, especially acrylic acid, methacrylic acid, maleic acid, fumaric acid and itaconic acid, with in general $C_1$–$C_{12}$, preferably $C_1$–$C_8$ and, in particular, $C_1$–$C_4$ alkanols, such as, in particular, acrylic and methacrylic methyl, ethyl, n-butyl, isobutyl and 2-ethylhexyl esters, dimethyl maleate or n-butyl maleate, nitriles of α,β-monoethylenically unsaturated carboxylic acids, such as acrylonitrile, and also $C_4$–$C_8$ conjugated dienes, such as 1,3-butadiene and isoprene.

The abovementioned monomers generally form the principal monomers which, based on the overall amount of monomers to be copolymerized, normally make up a proportion of more than 50% by weight. Compounds I, which when polymerized alone normally give rise to homopolymers of enhanced solubility in water, are normally copolymerized merely as modifying monomers, in amounts, based on the overall amount of the monomers to be polymerized, of less than 50% by weight, generally from 0.5 to 20% by weight, preferably from 1 to 10% by weight.

Examples of such monomers are α,β-monoethylenically unsaturated $C_3$–$C_6$ mono- and dicarboxylic acids and their amides, such as, for example, acrylic acid, methacrylic acid, maleic acid, fumaric acid, itaconic acid, acrylamide and methacrylamide, and also vinylsulfonic acid and its water-soluble salts, and N-vinylpyrrolidone.

Monomers which normally increase the inner strength of the films of the aqueous polymer dispersions are generally likewise copolymerized only in minor amounts, eg. from 0.5 to 10% by weight based on the overall amount of the monomers to be polymerized. Such monomers normally have an epoxy, hydroxyl, N-methylol or carbonyl group or at least two nonconjugated ethylenically unsaturated double bonds. Examples thereof are N-alkylolamides of α,β-monoethylenically unsaturated $C_3$–$C_{10}$ carboxylic acids and their esters with $C_1$–$C_4$ alkanols, among which special preference is given to N-methylolacrylamide and N-methylolmethacrylamide; monomers containing two vinyl radicals; monomers containing two vinylidene radicals; and monomers containing two alkenyl radicals. Among these, the diesters of dihydric alcohols with α,β-monoethylenically unsaturated monocarboxylic acids are preferably suitable, among which, in turn, acrylic and methacrylic acid are preferably employed. Examples of monomers of this kind containing two nonconjugated ethylenically unsaturated double bonds are alkylene glycol diacrylates and dimethacrylates, such as ethylene glycol diacrylate, 1,3-butylene glycol diacrylate, 1,4-butylene glycol diacrylate and propylene glycol diacrylate, divinylbenzene, vinyl methacrylate, vinyl acrylate, allyl methacrylate, allyl acrylate, diallyl maleate, diallyl fumarate, methylenebisacrylamide, cyclopentadienyl acrylate or triallyl cyanurate. Also of particular importance in this context are the $C_1$–$C_8$-hydroxyalkyl esters of methacrylic and acrylic acid, such as n-hydroxyethyl, n-hydroxypropyl or n-hydroxybutyl acrylate and methacrylate, and compounds such as diacetone-acrylamide and acetylacetoxyethyl acrylate and methacrylate.

In addition to monomers containing ethylenically unsaturated double bonds the compounds I may comprise—in minor amounts, usually from 0.01 to 2% by weight, based on the monomers to be polymerized—substances which regulate the molecular weight in the course of free-radical polymerizations, such as mercaptans, for example tert-dodecyl mercaptan or 3-mercaptopropyltri-methoxysilane.

Consequently, the compounds I may consist, for example, of

| | | |
|---|---|---|
| A) | from 80 to 100 parts by weight | of at least one monomer from the group consisting of styrene, α-methylstyrene, vinyltoluenes, esters of α,β-monoethylenically unsaturated $C_3$–$C_6$ carboxylic acids and $C_1$–$C_{12}$ alkanols, butadiene and vinyl esters and allyl esters of $C_1$–$C_{12}$ alkanecarboxylic acids (monomers A), and |
| B) | from 0 to 20 parts by weight | of other compounds I, containing at least one ethylenically unsaturated group (monomers B) | and, if desired, from 0.01 to 2% by weight, based on the sum of the monomers A and B, of molecular weight regulators I.

Examples of possible monomers A are n-butyl acrylate, 2-ethylhexyl acrylate, methyl methacrylate and styrene.

Possible monomers B are acrylamide, methacrylamide, acrylic acid, acrylonitrile, methacrylonitrile, 2-acrylamido-2-methylpropane-sulfonic acid, vinylpyrrolidone, hydroxyethyl acrylate, hydroxymethyl acrylate, hydroxypropyl acrylate, hydroxypropyl methacrylate, quaternized vinylimidazole, N,N-dialkylaminoalkyl (meth)acrylates, N,N-dialkylaminoalkyl(meth)acrylamides, trialkylammoniumalkyl (meth)acrylates and trialkylammoniumalkyl (meth)acrylamides. The expression (meth)acrylic as used herein is an abbreviation for "methacrylic or acrylic".

Other novel embodiments, however, include those where the compounds I are composed of

| | |
|---|---|
| from 70 to 100% by weight or | of esters of acrylic and/or methacrylic acid with $C_1$–$C_{12}$ alkanols and/or styrene, |
| from 70 to 100% by weight or | of styrene and/or butadiene, |
| from 70 to 100% by weight or | of vinyl chloride and/or vinylidene chloride, |
| from 40 to 100 % by weight | of vinyl acetate, vinyl propionate and/or ethylene. |

In many cases the choice of monomer composition within the abovementioned compositional range is made such that the glass transition temperatures (DSC, midpoint temperature) of the resulting polymers, on polymerization of the compounds I alone, would be below 50° C., or below 30° C., often below 20° C. and in many cases even below 0° C. (down to −70° C.).

The compounds II may likewise contain monoethylenically unsaturated groups. In this case they should be counted with the monomers to be polymerized.

Examples of such compounds II are p-tert-butylstyrene, esters of α,β-monoethylenically unsaturated $C_3$–$C_6$ carboxylic acids with alkanols having more than 12 carbon atoms (generally up to 30 carbon atoms), for example stearyl acrylate, or else esters of vinyl alcohol or allyl alcohol with alkanecarboxylic acids having more than 12 carbon atoms (generally up to 30 carbon atoms), for example vinyl stearate. The copolymerizable compounds II also, however, include macromonomers, such as oligopropene acrylate. In very general terms, macromonomers are polymeric or oligomeric compounds containing at least one—usually terminal—ethylenically unsaturated double bond. To be suitable for use as a possible compound II, their relative number-average molecular weight should preferably be not more than 100,000. In general this relative number-average molecular weight will be from 1000 to 50,000, or from 2000 to 50,000. Macromonomers are known to the skilled worker. Their preparation is described, for example, in Makromol. Chem. 223 (1994) pp. 29 to 46. In very general terms, copolymerizable compounds II are those monomers whose molal solubility in water at 25° C. and 1 bar is lower than the corresponding molal solubility of lauryl acrylate (in some cases lauryl acrylate itself can also be used as a possible compound II). Further examples of such monomers are the methacryloyl-polybutyl acrylate AB-6 and the methacryloyl-polystyrene AS-6 from Toa Gasei Kagaku KK (JP), both of which have a number-average relative molecular weight of 6000. However, Polyol 130 from Hüls AG (a stereospecific polybutadiene of low viscosity (75% 1,4-cis, 24% 1,4-trans, 1% vinyl) whose dynamic viscosity at 20° C. is 3000 mPa•s) and Polyol 110 from Hüls AG (a stereospecific polybutadiene of low viscosity (75% 1,4-cis, 24% 1,4-trans, 1% vinyl) whose dynamic viscosity at 20° C. is 3000 mPa•s) also constitute compounds II which can be employed as macromonomers.

It is of course possible, given an appropriately low solubility in water, for compounds of relatively high molecular mass, containing no ethylenically unsaturated group, to form suitable compounds II. An example which may be mentioned is Acronal® A 150 F, a poly-n-butyl acrylate from BASF AG whose 50% strength by weight solution in ethyl acetate has a viscosity at 230C and 1 atm (determined in accordance with ISO 3219, DIN 53 019, at 250 s$^{-1}$) of 33 mPa•s.

Yet another possible compound II is PnBA, a high-temperature (120° C.) solution (isopropanol) polymer of n-butyl acrylate with a K value, determined at 25° C. in isopropanol, of 24. The K value is a relative viscosity number which is determined in analogy to DIN 53 726. It expresses the flow rate of the pure solvent relative to the flow rate of the 0.1% strength by weight solution of the polymer in the same solvent (cf. also Cellulosechemie, Vol. 13 (1932), pp. 58–64, and Kirk-Othmer, Encyclopedia of Chemical Technology, Vol. 23, pp. 967–968). The K value is a measure of the mean molecular weight of a polymer. A high K value corresponds to a high mean molecular weight.

Still further possible compounds II are resins, such as colophony resins (cf. Ullmanns Encykl. Techn. Chem. 4th edition (1976), Vol. 12, pp. 525–538) and hydrocarbon resins (cf. Encycl. Polym. Sci. Eng. (1987) Vol. 7, pp. 758–782), such as, for example, Kristalex F 85 from Hercules. An example which may be mentioned is Foral® 85 E, a glycerol ester of highly hydrogenated colophony resin (softening point: 86° C.) from Hercules.

Further compounds suitable as possible compounds II (which are frequently employed in the form of mixtures) are other water-insoluble, oil-soluble substances, such as aliphatic and aromatic hydrocarbons (eg. hexadecane), oil-soluble silicone compounds, and film-forming auxiliaries or plasticizers, such as Plasti-lit® 3060 (a polypropylene glycol alkylphenyl ether plasticizer). It is of course also possible for the compounds II used to comprise molecular weight regulators (eg. water-insoluble mercaptans). Based on the amount of monomers to be free-radically polymerized in accordance with the invention, the proportion of regulators will not normally exceed 2% by weight.

The aqueous emulsion I which is required in accordance with the invention can be prepared in a simple and conventional manner by mixing together the compounds I and II which produce said emulsion and first of all simply stirring the mixture into an aqueous solution, containing dissolved emulsifier, so as to produce an aqueous monomer macroemulsion. The aqueous emulsifier solution here may even already include added pH buffer substances, such as sodium bicarbonate, which place the pH of the aqueous medium in a favorable range during the subsequent free-radical polymerization. As emulsifier it is preferred to use anionic and/or nonionic emulsifiers. However, the use of cationic emulsifiers is also possible in principle. It is possible to employ all those emulsifiers whose applicability for free-radical aqueous macroemulsion polymerization is known (oil-in-water emulsifiers).

Examples of customary emulsifiers are ethoxylated mono-, di- and trialkylphenols (EO units: 3 to 50, $C_4$–$C_9$-alkyl), ethoxylated fatty alcohols (EO units: 3 to 50, $C_8$–$C_{36}$-alkyl), and alkali metal and ammonium salts of $C_8$–$C_{12}$-alkyl sulfates, of sulfuric acid half-esters of ethoxylated $C_{12}$–$C_{18}$-alkanols (EO units: 4 to 30) and of ethoxylated alkylphenols (EO units: 3 to 50, $C_4$–$C_9$-alkyl), of alkylsulfonic acids ($C_{12}$–$C_{18}$-alkyl) and of alkylarylsulfonic acids ($C_9$–$C_{18}$-alkyl). Further suitable emulsifiers are given in Houben-Weyl, Methoden der organischen Chemie, Volume XIV/1, Makromolekylare Stoffe, Georg-Thieme Verlag, Stuttgart, 1961, pages 192 to 208.

Other compounds which have been found suitable as emulsifiers are those of the formula I

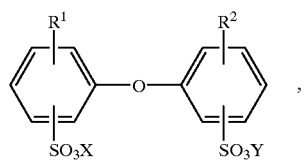

(I)

in which $R^1$ and $R^2$ are hydrogen or $C_4$–$C_{24}$-alkyl and are not both hydrogen, and X and Y can be alkali metal ions and/or ammonium ions. In the formula I, $R^1$ and $R^2$ are preferably linear or branched alkyl radicals having 6 to 18 carbon atoms, or hydrogen, and especially having 6, 12 and 16 carbon atoms, $R^1$ and $R^2$ not both being hydrogen. X and Y are preferably sodium, potassium or ammonium ions, sodium being particularly preferred. Particularly advantageous compounds I are those in which X and Y are sodium, $R^1$ is branched $C_{12}$-alkyl and $R^2$ is hydrogen or is $R^1$. Use is frequently made of technical-grade mixtures comprising a proportion of from 50 to 90% by weight of the monoalkylated product, for example Dowfax® 2A1 (trademark of Dow Chemical Company). The compounds I are generally known, for example, from U.S. Pat. No. 4,269,749, and are obtainable commercially.

In accordance with the invention the amount of emulsifier is expediently chosen such that in the ultimate aqueous emulsion I, within the aqueous phase, the critical micelle concentration of the emulsifiers used is essentially not exceeded. Based on the amount of compounds I and II present in the aqueous emulsion I, this amount of emulsifier is generally within the range from 0.1 to 5% by weight.

Since the abovementioned emulsifiers also stabilize the disperse distribution in the ultimate aqueous polymer dispersion, protective colloids can additionally be added to them at the side. These have the ability to bring about almost no reduction in the surface tension of water, and generally have relative molecular weights of more than 1000. Examples of possible protective colloids are polyvinyl alcohols, cellulose derivatives, or copolymers containing vinylpyrrolidone. A detailed description of further suitable protective colloids is given in Houben-Weyl, Methoden der organischen Chemie, Volume XIV/1, Makromolekylare Stoffe, Georg-Thieme-Verlag, Stuttgart, 1961, pp. 411 to 420.

The aqueous monomer macroemulsion obtainable as described can subsequently be homogenized in a customary manner to give the aqueous emulsion I required in accordance with the invention (cf. P. L. Tang, E. D. Sudol, C. A. Silebi and M. S. El-Aasser in Journal of Applied Polymer Science, Vol. 43, pp. 1059–1066 [1991]). This is generally done by using high-pressure homogenizers. The fine dispersion of the components is achieved in these machines by means of a high local input of energy. In this respect, two variants have become particularly established.

In the first variant, the aqueous monomer macroemulsion is compressed to more than 1000 bar using a piston pump, and is then released through a narrow gap. In this case the action is based on an interplay of high shear and pressure gradients and cavitation in the gap. An example of a high-pressure homogenizer operating in accordance with this principle is the Niro-Soavi high-pressure homogenizer model NS1001L Panda.

In the second variant, the compressed aqueous monomer macroemulsion is released into a mixing chamber through two nozzles which are directed against one another. The action of fine dispersion is in this case dependent above all on the hydrodynamic conditions in the mixing chamber. An example of this type of homogenzer is the Microfluidizer model M 120 E from Microfluidics Corp. In this high-pressure homogenizer, the aqueous monomer macroemulsion is compressed by means of a pneumatically operated piston pump to pressures of up to 1200 bar, and is released through an "interaction chamber". In this chamber, the jet of emulsion is divided, in a microchannel system, into two jets which are caused to intersect at 180°. Another example of a homogenizer operating in accordance with this mode of homogenization is the Nanojet model Expo from Nanojet Engineering GmbH. However, with the Nanojet, instead of a solid channel system, two homogenizing valves are installed which can be adjusted mechanically.

In addition to the abovementioned principles, homogenization can also be brought about, for example, by the use of ultrasound (eg. the Branson Sonifier II 450). In this case the fine dispersion is a result of cavitation mechanisms. In this case the quality of the aqueous emulsion I produced in the sonic field is dependant not only on the sonic input but also on other factors, such as, for example, the intensity distribution of the ultrasound in the mixing chamber, the residence time, the temperature, and the physical properties of the substances to be emulsified, for example their toughness, surface tension and vapor pressure. In this context the resulting droplet size depends, inter alia, on the concentration of the emulsifier and on the energy input for homogenization, and can be adjusted specifically by, for example, making a corresponding change in the homogenization pressure and/or in the corresponding ultrasound energy.

The mean size of the droplets of the disperse phase of the aqueous emulsion I to be used in accordance with the invention can be determined in accordance with the principle of quasi-elastic dynamic light scattering (the z-mean droplet diameter $\bar{d}_z$ of the unimodal analysis of the autocorrelation function). In the Examples in this document, this was done using a Coulter N4 Plus Particle Analyser from Coulter Scientific Instruments (1 bar, 25° C.). The measurements were carried out on dilute aqueous emulsions I whose content of nonaqueous constituents was 0.01% by weight.

Dilution was carried out using water which had been saturated beforehand with the compounds I and II present in the aqueous emulsion. This latter measure is intended to prevent a change in the droplet diameters going hand in hand with dilution.

In accordance with the invention, the values thus determined for $\bar{d}_z$ are normally $\leq 500$ nm, in many cases $\leq 400$ nm. A favorable $\bar{d}_z$ range, according to the invention, is that from 100 nm to 300 nm, or from 100 nm to 200 nm. Normally, $\bar{s}_z$ of the aqueous emulsion I employed in accordance with the invention is $\geq 40$ nm.

The aqueous emulsions I used in accordance with the invention normally comprise, based on the compounds I that are present, at least 0.5% by weight of compounds II. There is no upper limit on this amount of compounds II present. This statement is valid in particular if the compounds II used are exclusively those which themselves contain at least one free-radically polymerizable unsaturated group. In general, however, this content of compounds II will not exceed 200% by weight, and will frequently be $\leq 100\%$ by weight. Further novel embodiments are those in which said content of compounds II is from 1 to 50% by weight, or from 2 to 30% by weight, or from 5 to 15% by weight.

The overall content of compounds I and II in the aqueous emulsion I is normally not more than 50% by weight, based on the aqueous emulsion I. A higher overall content of compounds I and II is generally associated with an inappropriate flow resistance, whose reduction requires a polydisperse (at its most simple, bimodal) adjustment of the droplet diameter distribution in the disperse phase.

Suitable constituents of the feed stream II are in principle all those compounds I which can also be a constituent of the aqueous emulsion I. In general, however, the compounds I present in the feed stream II are selected such that their individual molal solubility in water under the polymerization conditions is greater than the corresponding water-solubility of that compound I of the aqueous emulsion I that is the least soluble in water under polymerization conditions. Preferably, however, the individual molal solubility of the compounds I of the feed stream II under the polymerization conditions, in water, should be poorer than in the dispersed droplets of the aqueous emulsion I.

Advantageously, the feed stream II comprises exclusively compounds I. This variant embodiment of the novel process is particularly favorable when it is desired that the resulting aqueous polymer dispersion have a high solids content. However, an aqueous monomer macroemulsion of the compounds I is also suitable in principle as feed stream II. In the latter case, it is possible to employ all those emulsifiers which have already been mentioned in connection with the aqueous emulsion I. In accordance with the invention, for example, up to 10% by weight, up to 20% by weight, or up to 30% by weight, or up to 40% by weight, or up to 50% by weight, or up to 60% by weight, or up to 70% by weight, or up to 80% by weight, or up to 90% by weight or more, or all, of the aqueous emulsion I can be supplied continuously to the polymerization vessel as at least one feed stream I. Said feed stream I can then, in accordance with the invention, be accompanied, for example, throughout its entire duration by a feed stream II.

Very simply, the novel process can be carried out such that some water is charged to the polymerization vessel, the initial charge of water is heated to the polymerization temperature, and then, by way of spatially separate feeds, the aqueous emulsion I and the free-radical polymerization initiator, generally in the form of an aqueous solution are supplied continuously to the polymerization vessel, while the polymerization is maintained. In this case, the feed stream II which is essential to the invention will be supplied synchronously to the aqueous emulsion I. Novel advantages over the feed techniques of the prior art, however, generally already occur when the feed stream II accompanies the continuous supply of the aqueous emulsion I only at times. In addition, the feed stream II may extend beyond the end of the continuous supply of the aqueous emulsion I.

In many cases, however, the novel process will be carried out such that up to 50% by weight, or up to 30% by weight, or up to 15% by weight of the aqueous emulsion I, with or without the addition of water, is charged to the polymerization vessel, the initial charge is heated to the polymerization temperature, free-radical polymerization initiator is added, the resulting mixture is partially polymerized, and then the remainder of the aqueous emulsion I is supplied continuously to the polymerization vessel, while the polymerization is maintained, and this supply is accompanied by a preferably synchronous continuous supply of polymerization initiator and by a preferably synchronous supply of the feed stream II. In principle, however, it is also possible to charge the overall amount of free-radical polymerization initiator to the polymerization vessel. Here too, the feed stream II may only be supplied at times, and may also extend beyond the end of the supply of the aqueous emulsion I.

Normally, the overall molar amount of compounds I which are employed as a constituent of the feed stream II (molar amount A) will be $\leq$ to the overall molar amount of compounds I which are employed as a constituent of the aqueous emulsion I (molar amount B). However, it may also be two or more times this amount. Accordingly, novel embodiments are those processes in which the molar amount A is up to 300% or up to 100%, or up to 75%, or up to 50% or up to 25% or up to 10%, of the molar amount B. The lower limit is often at 5%.

Suitable free-radical polymerization initiators are in principle all those capable of initiating a free-radical polymerization. They may be either peroxides or hydroperoxides, or azo compounds. They can be either oil-soluble or water-soluble.

For the novel process it is preferred to employ free-radical polymerization initiators of high solubility in water. Examples of such polymerization initiators are peroxodisulfuric acid and its ammonium and alkali metal salts, and also hydrogen peroxide and tert-butyl hydroperoxide. It is of course also possible, as such water-soluble free-radical polymerization initiators, to make use of combined systems composed of at least one reducing agent and at least one peroxide and/or hydroperoxide. Examples of such combinations are tert-butyl hydroperoxide/sodium hydroxymethanesulfinate, and hydrogen peroxide/ascorbic acid. In addition, the combined systems frequently include a small amount of a metal compound which is soluble in the aqueous medium and whose metallic component can exist in a number of valency states. Examples of such systems are ascorbic acid/iron (II) sulfate/hydrogen peroxide, or sodium sulfite/iron (II) sulfate/hydrogen peroxide. In the abovementioned systems, it is of course also possible for ascorbic acid to be replaced by sodium hydroxy-methanesulfinate, sodium hydrogen sulfite or sodium metal bisulfite. Also, in the abovementioned systems, hydrogen peroxide can be replaced by tert-butyl hydroperoxide or alkali metal peroxodisulfates and/or ammonium peroxodisulfates. Instead of a water-soluble iron (II) salt, use is often made of a combination of water-soluble Fe/V salts.

Based on the monomers to be free-radically polymerized, it is common to use from 0.1 to 10% by weight, frequently from 0.5 to 5% by weight, of free-radical polymerization initiators.

In the novel process the polymerization temperature generally depends on the decomposition temperature of the free-radical polymerization initiator that is employed. Redox initiator systems generally decompose at particularly low temperatures. Typical polymerization temperatures are from 0 to 95° C., frequently from 30 to 90° C. and in many cases from 50 to 85° C. If elevated pressure is employed, they may even be up to 120° C. or more. Polymerization is normally carried out under atmospheric pressure (1 bar).

In the context of the novel process the feed streams can be supplied to the polymerization reactor from above, from the side or through the reactor base.

The advantageous nature of the novel procedure is attributed—with no claim to absolute certainty—to the fact that the monomer droplets which have not been initiated do still indeed act like a monomer reservoir in giving up monomers to the aqueous phase, but that these monomers are hardly consumed at all by free-radical polymerization in the initiated monomer droplets, since in the aqueous phase a surplus of free-radically polymerizable compounds I is established, in the form of the feed stream II, which do not derive from the monomer miniemulsion droplets. Consequently, the possible reservoir function of the non-initiated monomer miniemulsion droplets is not utilized, thereby resulting in a more uniform product.

A further advantage of the novel process is the possibility of realizing increased polymer volume contents in the aqueous polymer dispersion (up to 60 or 70% by volume or more). With respect to these contents, it proves advantageous that the novel process leads generally to aqueous polymer dispersions that are polydisperse or polymodal in terms of the distribution function of the diameters of the dispersed polymer particles.

EXAMPLES

A) Preparation of aqueous emulsions I a) to t) suitable for the novel process

General preparation procedure:

An aqueous solution comprising water, 15% strength by weight aqueous sodium lauryl sulfate solution and, if desired, sodium bicarbonate was introduced as initial charge. While this charge was stirred, a feed stream 1 consisting of compounds I and II was supplied to said aqueous solution 1, and the resulting mixture was stirred for 10 minutes more after the supply was at an end. The resulting aqueous monomer macroemulsions were subsequently homogenized, using one of the homogenization methods A to D below, to form an aqueous monomer microemulsion:

A: High-pressure homogenizer Niro Soavi, model NS 1001 L Panda; for homogenizing the aqueous monomer macroemulsions one pass was carried out at 850 bar in each case;

B: Microfluidizer, model M 120 from Microfluidics Corp.; for homogenization, one pass was carried out at 1000 bar in each case;

C: High-pressure homogenizer Nanojet, model Expo; for homogenization, on pass was carried out at 850 bar in each case;

D: Ultrasound (Branson Sonifier II 450); 1 liter of the aqueous monomer macroemulsion was sonicated with stirring for 5 minutes each at the settings duty cycle 25%, output control 10 and for 20 minutes each at duty cycle 100% and output control 10.

The aqueous monomer miniemulsion obtained was characterized by determining its $\bar{d}_z$ [nm].

Table 1 shows the results obtained and the composition (all data are in grams) of each of the solutions 1 and feed streams 2 that were used.

Table 1 also indicates the homogenizer employed.

TABLE 1

| | Aqueous monomer miniemulsions | | | | | | | | | |
|---|---|---|---|---|---|---|---|---|---|---|
| | a | b | c | d | e | f | g | h | i | j |
| Solution 1 | | | | | | | | | | |
| Sodium bicarbonate | 0.64 | 0.64 | 0.64 | 0.64 | 0.45 | 0.45 | 0.65 | 0.65 | 0.65 | 0.65 |
| 15% strength by weight aqueous sodium lauryl sulfate solution | 14.1 | 14.1 | 14.1 | 14.1 | 9.8 | 9.8 | 14.1 | 14.1 | 14.1 | 14.1 |
| Water | 1421 | 1421 | 1476 | 1504 | 968 | 967 | 1393 | 1393 | 1393 | 1393 |
| Feed stream 1 | | | | | | | | | | |
| I: | | | | | | | | | | |
| n-Butyl acrylate | 360 | 360 | 360 | 360 | — | — | 288 | 252 | 216 | 180 |
| Styrene | — | — | — | — | 200 | 125 | — | — | — | — |
| II: | | | | | | | | | | |
| Hexadecane | 7.2 | — | — | — | — | — | — | — | — | — |
| PnBA | — | 14.4 | 21.6 | 28.0 | — | — | — | — | — | — |
| Stearyl acrylate | — | — | — | — | 50 | 125 | 72 | 108 | 144 | 180 |
| Lauryl acrylate | — | — | — | — | — | — | — | — | — | — |
| Polyol 110 | — | — | — | — | — | — | — | — | — | — |
| Polyol 130 | — | — | — | — | — | — | — | — | — | — |
| Plastilit 3060 | — | — | — | — | — | — | — | — | — | — |
| AB-6 | — | — | — | — | — | — | — | — | — | — |
| AS-6 | — | — | — | — | — | — | — | — | — | — |
| Homogenization | B | B | B | B | B | B | C | C | C | C |

TABLE 1-continued

| Aqueous monomer miniemulsions | | | | | | | | | | |
|---|---|---|---|---|---|---|---|---|---|---|
| $d_z$ | 200 | 430 | 93 | 101 | 158 | 163 | 129 | 141 | 151 | 175 |
|  | k | l | m | n | o | p | q | r | s | t |
| Solution 1 | | | | | | | | | | |
| Sodium bicarbonate | 0.65 | 0.65 | 0.65 | — | — | 0.56 | 0.56 | 0.56 | 0.56 | 0.4 |
| 15% strength by weight aqueous sodium lauryl sulfate solution | 14.1 | 14.1 | 14.1 | 1.6 | 1.6 | 11.2 | 11.2 | 11.2 | 11.2 | 8 |
| Water | 1477 | 1421 | 1477 | 164.4 | 159.6 | 1227 | 1227 | 1227 | 1227 | 800 |
| Feed stream 1 | | | | | | | | | | |
| I: | | | | | | | | | | |
| n-Butyl acrylate | 360 | 360 | 360 | 40 | 38.8 | 280 | — | — | 280 | 160 |
| Styrene | — | — | — | — | — | — | 280 | 280 | — | — |
| II: | | | | | | | | | | |
| Hexadecane | — | — | — | — | — | — | — | — | — | — |
| PnBA | — | — | — | — | — | — | — | — | — | — |
| Stearyl acrylate | — | — | — | — | — | — | — | — | — | 40 |
| Lauryl acrylate | — | — | — | — | 1.2 | — | — | — | — | — |
| Polyol 110 | 21.6 | — | — | — | — | — | — | — | — | — |
| Polyol 130 | — | 7.2 | 21.6 | — | — | — | — | — | — | — |
| Plastilit 3060 | — | — | — | 1.2 | — | — | — | — | — | — |
| AB-6 | — | — | — | — | — | 28 | 28 | — | — | — |
| AS-6 | — | — | — | — | — | — | — | 28 | 28 | — |
| Homogenization | A | A | A | C | C | C | C | C | C | D |
| $d_z$ | 166 | 163 | 137 | 246 | 214 | 133 | 211 | 160 | 159 | 155 |

B) Novel and non-novel preparation of aqueous polymer dispersions

General preparation procedure:

First of all aqueous emulsions I were produced as in Ex. A). Homogenization in all cases was in accordance with homogenization method A.

Then a defined amount of water was charged to the polymerization vessel and heated to 85° C.

Subsequently, 10% by weight of the aqueous emulsion I and 15% by weight of a feed stream 2 (aqueous sodium peroxodisulfate solution as free-radical polymerization initiator) were added all at once to the heated initial charge, and the resulting mixture was polymerized at 85° C. for 15 minutes.

Next, beginning simultaneously, the remainder of the aqueous emulsion I as feed stream I (over the course of 2 h), the remainder of feed stream 2 (over the course of 2 h and 30 min) and, if desired, a feed stream II consisting of compounds I (over the course of 2 h) were supplied continuously to the polymerization vessel, via spatially separate feeds, during which the temperature of 85° C. was maintained. After the end of the feeds, the reaction mixture was held at 85° C., with stirring, for 1 h more and then cooled to 25° C.

The resulting aqueous polymer dispersions were characterized by examining their solids content (SC, in % by weight, based on aqueous polymer dispersion), the pH of the aqueous dispersion medium, the LT value (ie. the light transmittance of an aqueous polymer dispersion diluted to an SC of 0.01% by weight (determined for a path length of 2.5 cm) relative to the light transmittance of pure water (LT value=100)), the amount of macrocoagulum present, CC (percentage by weight of the residue which remains on a filter with a mesh size of 125 $\mu$m when the aqueous polymer dispersion is filtered, relative to the solids content of the aqueous polymer dispersion), and the amount of seediness S still present after said filtration (ie. microcoagulum; the amount was determined by optical evaluation of a film of the aqueous polymer dispersion with a dry thickness of 60 $\mu$m, film formation taking place 10° C. above its minimum film-forming temperature (DIN 53 787) but not below 20° C.; 1=seedless, 5=worst assessment).

As a measure of the breadth of the diameter distribution of the dispersed polymer particles, the quotient $Q=d_{90}-d_{10}/d_{50}$ was calculated, $d_m$ being the diameter not exceeded by m % by weight of the dispersed polymer particles. As a measure of the chemical uniformity of the dispersed polymer particles, their mass density distribution was investigated. The investigations into polymer particle diameter distribution and into mass density distribution were both carried out in an analytical ultracentrifuge using $H_2O/D_2O$ sedimentation analysis and using dynamic density gradients. A detailed description of the measurement methods by W. Machtle is given in "Analytical Ultracentrifugation in Biochemistry and Polymer Science", S. E. Harding et al. (Eds.), Royal Society of Chemistry, Cambridge, England (1992), Chapter 10.

In the text below, the compositions employed (amounts in grams) and the results obtained are set out in detail.

D1: Initial charge: 300 g of water;

Solution 1: 738.4 g of water, 1.6 g of sodium bicarbonate, 32 g of 15% strength by weight aqueous sodium lauryl sulfate solution;

Feed stream 1: 400 g of n-butyl acrylate (I), 160 g of stearyl acrylate (II);

Feed stream 2: 150 g of water, 4 g of sodium peroxodisulfate;
Feed stream II: 240 g of n-butyl acrylate (I);
SC: 39% by weight;
pH: 3.0;
LT: 58;
$\bar{d}_z$ (aqueous emulsion I): 177 nm;
$\bar{d}_z$ (resulting polymer dispersion D1): 235 nm;
CC: 0% by weight;
S: 1;
Q: 0.986;
The mass desity of the dispersed polymer particles, $d_4^{25}$, extends over the range from 1.019 g/cm$^3$ to 1.044 g/cm$^3$.
This shows that, in the course of polymerization, neither pure poly-n-butyl acrylate ($d_4^{25}$=1.06 g/cm$^3$) nor pure polystearyl acrylate ($d_4^{25}$=0.94 g/cm$^3$) was formed.
The values for CC and S show that D1 was essentially free from coagulum.

VD1: Initial charge, solution 1 and feed stream 2 as for D1.
However, feed stream 1 consisted of 640 g of n-butyl acrylate (I) and 160 g of stearyl acrylate (II); hence no feed stream II was used.
SC: 37.6% by weight;
pH: 3.3;
LT: 28;
$\bar{d}_z$ (aqueous emulsion I): 344 nm;
$\bar{d}_z$ (resulting polymer dispersion VD1): 287 nm;
CC: 8.5% by weight;
S: 3;
The aqueous polymer dispersion VD1 had a considerable amount of floating coagulum, which according to analysis by DSC (Differential Scanning Calorimetry) consisted of pure polystearyl acrylate. The overall compositions of D1 and VD1 are identical.

D2: Initial charge, solution 1 and feed streams 2 and II as for D1.
However, feed stream 1 consisted of 280 g of n-butyl acrylate (I) and 280 g of stearyl acrylate (II);
SC: 39.4% by weight;
pH: 2.9;
LT: 52;
$\bar{d}_z$ (aqueous emulsion I): 197 nm;
$\bar{d}_z$ (resulting polymer dispersion D2): 234 nm;
CC: 2% by weight;
S: 1;
Q: 1.437;
$d_4^5$: 0.975 g/cm$^3$ to 1.045 g/cm$^3$;
D2 differs from D1 only by an increased proportion of stearyl acrylate.
Nevertheless, no formation of polystearyl acrylate was observed.

VD2: AS D2, but feed stream II was omitted and not replaced.
SC: 31.8% by weight;
pH: 3.7;
LT: 39;
$\bar{d}_z$ (aqueous emulsion I): 223 nm;
$\bar{d}_z$ (resulting polymer dispersion VD2): 228 nm;
CC: 3.8% by weight;
S: 3;
The aqueous polymer dispersion VD2 had, like VD1, a considerable amount of floating polystearyl acrylate.

VD3: Initial charge: 200 g of water;
Solution 1: 838.4 g of water, 1.6 g of sodium bicarbonate, 32 g of 15% strength by weight aqueous sodium lauryl sulfate solution;
Feed stream 1: 520 g of n-butyl acrylate (I), 280 g of stearyl acrylate (II);
Feed stream 2: 150 g of water, 4 g of sodium peroxodisulfate;
Feed stream II: __;
SC: 39.2% by weight;
pH: 3.2;
LT: 31;
$\bar{d}_z$ (aqueous emulsion I): 253 nm;
$\bar{d}_z$ (resulting polymer dispersion VD3): 258 nm;
CC: 5.0% by weight;
S: 3;
The aqueous polymer dispersion VD3, although having the same overall composition as D2, differed in containing considerable amounts of floating polystearyl acrylate.

D3: Initial charge: 300 g of water;
Solution 1: 834.4 g of water, 1.6 g of sodium bicarbonate, 32 g of 15% strength by weight aqueous sodium lauryl sulfate solution;
Feed stream 1: 560 g of styrene (I); 64 g PnBA (II);
Feed stream 2: 150 g of water, 4 g of sodium peroxodisulfate;
Feed stream II: 240 g of styrene (I);
SC: 39.2% by weight;
pH: 6,5;
LT: 20;
$\bar{d}_z$ (aqueous emulsion I): 210 nm;
$\bar{d}_z$ (resulting polymer dispersion): 245 nm;
CC: 1.6% by weight;
S: 2;
$d_4^{25}$: 1.050 g/cm$^3$ to 1.054 g/cm$^3$;
The polymer particle diameter distribution was markedly bimodal.
The $d_4^{25}$ values of PnBA and polystyrene are 1.05 and 1.06 g/cm$^3$ respectively.

VD4: Initial charge, solution 1 and feed stream 2 as for D3.
However, feed stream 1 consisted of 800 g of styrene (I) and 64 g of PnBA; hence no feed stream II was used:
SC: 39% by weight;
pH: 7.2;
LT: 16;
$\bar{d}_z$ (aqueous emulsion I): 237 nm;

$\bar{d}_z$ (resulting polymer dispersion VD4): 258 nm;
CC: 3.0% by weight;
S: 3;
Relative to D3, VD4 had an increased amount of macro- and microcoagulum.
D4: Initial
charge: 300 g of water;
Solution 1: 834.4 g of water, 1.6 g of sodium bicarbonate, 32 g of 15% strength by weight aqueous sodium lauryl sulfate solution;
Feed stream 1: 560 g of styrene (I); 64 of g AB-6 (II);
Feed stream 2: 150 g of water, 4 g of sodium peroxodisulfate;
Feed stream II: 240 g of styrene (I);
SC: 39.4% by weight;
pH: 5.1;
LT: 18;
pH: 6.2;
LT: 11;
$\bar{d}_z$ (aqueous emulsion I): 282 nm;
$\bar{d}_z$ (resulting polymer dispersion): 260 nm;
CC: 3.1% by weight;
S: 2;

Relative to D4, VD5 had an increased proportion of macro-coagulum. DSC analysis of the macrocoagulum showed a marked enrichment of AB-6 in comparison with the AB-6 content of the film formed from the filtered aqueous polymer dispersion.

In order to demonstrate the broad applicability of the novel procedure and to show the possibility of obtaining high solids contents, Table 2 below shows further working examples D5 to D15. The units used for the individual variables correspond to those used in the preceding examples.

TABLE 2

|  | D5 | D6 | D7 | D8 | D9 | D10 | D11 | D12 | D13 | D14 | D15 |
|---|---|---|---|---|---|---|---|---|---|---|---|
| Initial charge of water | 300 | 300 | 300 | 300 | 300 | 300 | 150 | 150 | 150 | 300 | 300 |
| Solution 1 |  |  |  |  |  |  |  |  |  |  |  |
| Sodium bicarbonate | 3.6 | 1.6 | 1.6 | 1.6 | 1.6 | 3.6 | 0.8 | 0.8 | 0.8 | 1.6 | 1.6 |
| 15% strength by weight aqueous sodium lauryl sulfate solution | 72 | — | 32 | 32 | 32 | 72 | 16 | 16 | 16 | 32 | 32 |
| Dowfax 2A1 | — | 17.8 | — | — | — | — | — | — | — | — | — |
| Water | 704.4 | 760.6 | 834.4 | 834.4 | 834.4 | 800.4 | 549.2 | 549.2 | 489.2 | 834.4 | 834.4 |
| Feed stream 1 |  |  |  |  |  |  |  |  |  |  |  |
| I: |  |  |  |  |  |  |  |  |  |  |  |
| Styrene | — | 400 | — | 400 | 392 | — | — | 280 | — | 160 | 280 |
| n-Butyl acrylate | 400 | — | 560 | 160 | 152 | 792 | 280 | — | 260 | 400 | 280 |
| Methacrylic acid | — | — | — | — | — | — | — | — | 20 | — | — |
| Acrylic acid | — | — | — | — | 16 | — | — | — | — | — | — |
| II: |  |  |  |  |  |  |  |  |  |  |  |
| Stearyl acrylate | 360 | 160 | — | — | — | — | — | — | — | — | — |
| Foral 85 E | — | — | — | — | — | — | 120 | 120 | 80 | — | — |
| PnBA | — | — | 64 | 64 | 64 | 144 | — | — | — | 64 | 64 |
| Feed stream 2 |  |  |  |  |  |  |  |  |  |  |  |
| Water | 150 | 150 | 150 | 150 | 150 | 150 | 75 | 75 | 75 | 150 | 150 |
| Sodium peroxodisulfate | 9 | 4 | 4 | 4 | 4 | 9 | 2 | 2 | 2 | 4 | 4 |
| Feed stream II |  |  |  |  |  |  |  |  |  |  |  |
| n-Butyl acrylate | 1040 | — | 240 | 240 | 240 | 1008 | 120 | — | 120 | — | 120 |
| Styrene | — | 240 | — | — | — | — | — | 120 | — | 240 | 120 |
| SC | 59.2 | 38.5 | 39.5 | 39.3 | 38.8 | 59.4 | 38.7 | 39.2 | 39.1 | 38.8 | 38.8 |
| pH | 2.1 | 4.3 | 2.6 | 2.9 | 3.3 | 2.4 | 4.3 | 5.2 | 4.2 | 3.4 | 3.6 |
| LT | 38 | 58 | 60 | 41 | 50 | 36 | 56 | 29 | 58 | 36 | 37 |
| $\bar{d}_z$ (emulsion I) | 219 | 160 | 176 | 214 | 173 | 225 | 183 | 185 | 158 | 204 | 207 |
| $\bar{d}_z$ (dispersion) | 267 | 147 | 254 | 231 | 209 | 275 | 234 | 206 | 247 | 235.2 | 227.7 |
| CC | 5.1 | 1.6 | 0 | 0 | 0.1 | 0 | 0 | 0.1 | 0 | 0 | 0 |
| S | 3 | 2.0 | 3 | 2 | 2 | 2 | 1 | 2 | 2 | 2 | 2 |

$\bar{d}_z$ (aqueous emulsion I): 170 nm;
$\bar{d}_z$ (resulting polymer dispersion): 239 nm;
CC: 0.9% by weight;
S: 2;
VD5: Initial charge, solution 1 and feed stream 2 as for D4.
However, feed stream 1 consisted of 800 g of styrene (I) and 64 g of AB-6; hence no feed stream II was used;
SC: 39.1% by weight;

We claim:

1. A process for preparing an aqueous polymer dispersion by free-radically initiated polymerization of free-radically polymerizable compounds whose individual solubility in water under the conditions of the free-radically initiated polymerization is at least 0.001% by weight, based on the respective saturated aqueous solution (compounds I), whose disperse polymer particles comprise, in addition to the compounds I, at least one compound II whose solubility in water under the conditions of the free-radically initiated polymerization is less than 0.001% by weight, based on the respective saturated aqueous solution, and in which process a mixture consisting of a portion of the compounds I and of the at least one compound II is used to produce an oil-in-water emulsion I whose disperse phase consists predominantly of droplets with a diameter $\leq 500$ nm, and in which at least a portion of the oil-in-water emulsion I is supplied continuously as a feed stream I to the polymerization vessel in the course of continuing free-radical polymerization, wherein the continuous feed stream I is accompanied by at least one feed stream II, with the proviso that the at least one feed stream II is a feed stream of another portion of the compounds I and/or is an oil-in-water emulsion II of another portion of the compounds I, whose disperse phase consists predominantly of droplets with a diameter $\geq 1000$ nm.

2. A process as claimed in claim 1, wherein the compounds I are exclusively monomers containing at least one ethylenically unsaturated group.

3. A process as claimed in claim 1, wherein the compounds I are a mixture of molecular weight regulators and monomers comprising at least one ethylenically unsaturated group.

4. A process as claimed in claim 1, wherein the compounds I consist of

| | | |
|---|---|---|
| A) | from 80 to 100 parts by weight | of at least one monomer from the group consisting of styrene, α-methylstyrene, vinyltoluenes, esters of α,β-monoethylenically unsaturated $C_3$–$C_6$ carboxylic acids and $C_1$–$C_{12}$ alkanols, butadiene, and vinyl esters and allyl esters of $C_1$–$C_{12}$ alkanecarboxylic acids (monomers A), and |
| B) | from 0 to 20 parts by weight | of other compounds I, containing at least one ethylenically unsaturated group (monomers B) | and, optionally, from 0.01 to 2% by weight, based on the sum of the monomers A and B, of molecular weight regulators I.

5. A process as claimed in claim 4, wherein the monomers A are selected from the group consisting of n-butyl acrylate, 2-ethylhexyl acrylate, methyl methacrylate and styrene.

6. A process as claimed in claim 4, wherein the monomers B are selected from the group consisting of acrylamide, methacrylamide, acrylic acid, acrylonitrile, methacrylonitrile, 2-acrylamido-2-methylpropanesulfonic acid, vinylpyrrolidone, hydroxyethyl acrylate, hydroxymethyl acrylate, hydroxypropyl acrylate, hydroxypropyl methyacrylate, quaternized vinylimidazole, N,N-dialkylaminoalkyl (meth)acrylate, N,N-dialkylaminoalkyl (meth)acrylamide, trialkylammoniumalkyl (meth)acrylate and trialkylammoniumalkyl(meth)acrylamide.

7. A process as claimed in claim 1, wherein the compounds I are composed of from 70 to 100% by weight of esters of acrylic and/or methacrylic acid with $C_1$–$C_{12}$ alkanols and/or styrene.

8. A process as claimed in claim 1, wherein the compounds I are composed of from 70 to 100% by weight of styrene and/or butadiene.

9. A process as claimed in claim 1, wherein the compounds I are composed of from 70 to 100% by weight of vinyl chloride and/or vinylidene chloride.

10. A process as claimed in claim 1, wherein the compounds I are composed of from 40 to 100% by weight of vinyl acetate, vinyl propionate and/or ethylene.

11. A process as claimed in claim 1, wherein the compounds II contain at least one monoethylenically unsaturated group.

12. A process as claimed in claim 11, wherein the compounds II are selected from the group consisting of esters of α,β-monoethylenically unsaturated $C_3$–$C_6$ carboxylic acids and alkanols having more than 12 carbon atoms, esters of vinyl alcohol or allyl alcohol and alkanecarboxylic acids having more than 12 carbon atoms, and macromonomers.

13. A process as claimed in claim 1, wherein the compounds II contain no monoethylenically unsaturated group.

14. A process as claimed in claim 1, wherein the compounds II are a mixture of compounds II containing at least one monoethylenically unsaturated group and compounds II containing no monoethylenically unsaturated group.

15. A process as claimed in claim 1, wherein the compounds II comprise molecular weight regulators.

16. A process as claimed in claim 1, wherein $\bar{d}_z$ of the droplets of the aqueous emulsion I is from 40 nm to 400 nm.

17. A process as claimed in claim 1, wherein $\bar{d}_z$ of the droplets of the aqueous emulsion I is from 100 nm to 300 nm.

18. A process as claimed in claim 1, wherein $\bar{d}_z$ of the droplets of the aqueous emulsion I is from 100 nm to 200 nm.

19. A process as claimed in claim 1, wherein the aqueous emulsion I, based on the compounds I present, contains at least 0.5% by weight of compounds II.

20. A process as claimed in claim 1, wherein the aqueous emulsion I, based on the compounds I present, contains from 1 to 200% by weight of compounds II.

21. A process as claimed in claim 1, wherein the aqueous emulsion I, based on the compounds I present, contains from 2 to 100% by weight of compounds II.

22. A process as claimed in claim 1, wherein the compounds I present in the feed stream II are selected such that their individual molal solubility in water under the polymerization conditions is greater than the corresponding water-solubility of that compound I of the aqueous emulsion I that is the least soluble in water under polymerization conditions.

23. A process as claimed in claim 1, wherein the individual solubility in water, under the polymerization conditions, of the compounds I present in the feed stream II is poorer than in the dispersed droplets of the aqueous emulsion I.

24. A process as claimed in claim 1, wherein the feed stream II consists exclusively of compounds I.

25. A process as claimed in claim 1, wherein the overall molar amount of compounds I that are employed as a constituent of the feed stream II (molar amount A) is greater than the overall molar amount of compounds I that are employed as a constituent of the aqueous emulsion I (molar amount B).

26. A process as claimed in claim 1, wherein the overall molar amount of compounds I that are employed as a constituent of the feed stream II (molar amount A) is less than or equal to the overall molar amount of compounds I that are employed as a constituent of the aqueous emulsion I (molar amount B).

27. A process as claimed in claim 1, wherein water is charged to the polymerization vessel, the initial charge of water is heated to the polymerization temperature, and then, by way of spatially separate feeds, the aqueous emulsion I, the free-radical polymerization initiator and the feed stream II are supplied continuously to the polymerization vessel while the polymerization is maintained.

28. A process as claimed in claim 1, wherein, with or without the addition of water, up to 50% by weight of the aqueous emulsion I is charged to the polymerization vessel, the initial charge is heated to the polymerization temperature, free-radical polymerization initiator is added, the resulting mixture is partially polymerized, and then the remainder of the aqueous emulsion I is supplied continuously to the polymerization vessel, while the polymerization is maintained, and this supply is accompanied by a continuous supply of polymerization initiator and by a preferably synchronous supply of the feed stream II.

29. A process as claimed in claim 1, wherein a free-radical polymerization initiator is used which predominantly dissolves in the aqueous phase.

* * * * *